(12) United States Patent
Takeuchi et al.

(10) Patent No.: US 9,929,415 B2
(45) Date of Patent: Mar. 27, 2018

(54) FUEL CELL SYSTEM AND CONTROL METHOD THEREOF

(71) Applicant: Nissan Motor Co., Ltd., Yokohama-shi, Kanagawa (JP)

(72) Inventors: Kazufumi Takeuchi, Yokohama (JP); Tatsuya Yaguchi, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 378 days.

(21) Appl. No.: 14/685,357

(22) Filed: Apr. 13, 2015

(65) Prior Publication Data
US 2015/0221961 A1    Aug. 6, 2015

Related U.S. Application Data

(62) Division of application No. 13/322,038, filed as application No. PCT/IB2010/001628 on Jul. 2, 2010, now Pat. No. 9,406,949.

(30) Foreign Application Priority Data

Jul. 30, 2009   (JP) ................................ 2009-177746

(51) Int. Cl.
*H01M 8/04*     (2016.01)
*H01M 8/12*     (2016.01)
(Continued)

(52) U.S. Cl.
CPC ..... *H01M 8/04022* (2013.01); *H01M 8/0432* (2013.01); *H01M 8/0435* (2013.01);
(Continued)

(58) Field of Classification Search
CPC ......... H01M 8/04022; H01M 8/04097; H01M 8/04268; H01M 8/04223; H01M 8/0432;
(Continued)

(56) References Cited

U.S. PATENT DOCUMENTS 6,777,118 B2    8/2004   Shioya
8,097,371 B2    1/2012   Suehiro et al.
(Continued)

FOREIGN PATENT DOCUMENTS

EP    1571725 A1    9/2005
JP    62-080968     4/1987
(Continued)

*Primary Examiner* — Stephan Essex
(74) *Attorney, Agent, or Firm* — Global IP Counselors, LLP

(57) ABSTRACT

A fuel cell system includes a fuel cell, a first combustor, a second combustor, a first heating gas return channel, a second heating gas return channel and a gas supplier. The fuel cell includes a solid electrolyte cell with an anode and a cathode. The first combustor supplies a heating gas to the cathode. The second combustor supplies a heating gas to the anode. The first heating gas return channel is arranged to mix at least some exhaust gas discharged from the cathode with the heating gas from the first combustor. The second heating gas return channel is arranged to mix at least some exhaust gas discharged from the cathode with the heating gas from the second combustor. The gas supplier is connected to the first heating gas return channel for supplying the exhaust gas from the cathode to mix with the heating gas of the first combustor.

12 Claims, 12 Drawing Sheets

(51) Int. Cl.
| | |
|---|---|
| *H01M 8/04014* | (2016.01) |
| *H01M 8/04089* | (2016.01) |
| *H01M 8/04223* | (2016.01) |
| *H01M 8/0432* | (2016.01) |
| *H01M 8/0438* | (2016.01) |
| *H01M 8/04701* | (2016.01) |
| *H01M 8/04746* | (2016.01) |
| *H01M 8/0612* | (2016.01) |
| *H01M 8/1246* | (2016.01) |
| *H01M 8/1231* | (2016.01) |
| *H01M 8/124* | (2016.01) |

(52) U.S. Cl.
CPC ..... *H01M 8/0441* (2013.01); *H01M 8/04097* (2013.01); *H01M 8/04223* (2013.01); *H01M 8/04268* (2013.01); *H01M 8/04335* (2013.01); *H01M 8/04343* (2013.01); *H01M 8/04402* (2013.01); *H01M 8/04708* (2013.01); *H01M 8/04738* (2013.01); *H01M 8/04776* (2013.01); *H01M 8/0612* (2013.01); *H01M 8/1231* (2016.02); *H01M 8/1246* (2013.01); *H01M 2008/1293* (2013.01); *H01M 2250/20* (2013.01); *H01M 2300/0074* (2013.01); *Y02E 60/50* (2013.01); *Y02E 60/525* (2013.01); *Y02T 90/32* (2013.01)

(58) Field of Classification Search
CPC ........... H01M 8/04343; H01M 8/0435; H01M 8/04402; H01M 8/0441; H01M 8/04708; H01M 8/04776; H01M 8/0612; H01M 8/04335; H01M 8/04738
See application file for complete search history.

(56) References Cited

U.S. PATENT DOCUMENTS

| | | | |
|---|---|---|---|
| 2005/0136304 A1* | 6/2005 | Pettit | H01M 8/04022 429/441 |
| 2007/0104997 A1 | 5/2007 | Kim et al. | |
| 2010/0074838 A1 | 3/2010 | Nakamura et al. | |

FOREIGN PATENT DOCUMENTS

| | | |
|---|---|---|
| JP | 03-163761 | 7/1991 |
| JP | 05-144457 | 6/1993 |
| JP | 05-166527 | 7/1993 |
| JP | 05-303971 | 11/1993 |
| JP | 07-161371 | 6/1995 |
| JP | 2585210 B | 11/1996 |
| JP | 11-238522 | 8/1999 |
| JP | 2000-243423 | 9/2000 |
| JP | 2002-093437 | 3/2002 |
| JP | 2004-087350 | 3/2004 |
| JP | 2005-166439 | 6/2005 |
| JP | 2005-203229 | 7/2005 |
| JP | 2006-128006 | 5/2006 |
| JP | 2007-157544 | 6/2007 |
| JP | 2008-010258 | 1/2008 |
| JP | 2008-071747 | 3/2008 |
| JP | 2009-277621 | 11/2009 |
| JP | 2010-108767 | 5/2010 |
| JP | 2010-211931 | 9/2010 |
| RU | 2239931 C2 | 11/2004 |
| RU | 2249887 C2 | 4/2005 |
| RU | 2335829 C2 | 10/2008 |
| WO | 2007119736 A1 | 10/2007 |
| WO | 2007136077 A2 | 11/2007 |
| WO | 2008108069 A1 | 9/2008 |

\* cited by examiner

FUEL CELL SYSTEM AND CONTROL METHOD THEREOF

CROSS-REFERENCE TO RELATED APPLICATIONS

This application is a divisional application of U.S. patent application Ser. No. 13/322,038 filed on Nov. 22, 2011. U.S. patent application Ser. No. 13/322,038 is a U.S. National stage of International Application No. PCT/IB2010/001628, filed Jul. 2, 2010, which claims priority to Japanese Patent Application No. 2009-177746, filed on Jul. 30, 2009. The entire disclosures of both the Japanese Patent Application No. 2009-177746 and the U.S. patent application Ser. No. 13/322,038 are hereby incorporated herein by reference.

BACKGROUND

Field of the Invention

The present invention generally relates to a fuel cell system and a control method for raising the temperature of a fuel cell used in the fuel cell system.

Background Information

A fuel cell system is an electric power generation system in which hydrogen (serving as fuel) and air (serving as oxidizer) are supplied to a fuel cell to allow electrochemical reaction to take place in the fuel cell to generate electric power. One example of this type of fuel cell system is disclosed in Japanese Laid-Open Patent Application No. 2005-166439. The fuel cell system disclosed in Japanese Laid-Open Patent Application No. 2005-166439 uses a solid electrolyte fuel cell in which an anode is provided on one side of a solid electrolyte, while a cathode is provided on the other side. Air is supplied as oxidizing gas to the cathode while fuel gas is supplied to the anode. Power is generated by reacting the fuel gas with the air. The fuel cell system is configured having a startup combustor for reforming or partially combusting fuel gas introduced from the exterior during startup and supplying the resulting gas as a reducing gas to the anode. An exhaust gas combustor is provided for burning the anode off-gas discharged from the anode side, while a heat exchanger is provided for heating air with the heat produced from the exhaust gas combustor.

SUMMARY

It has been discovered that in the fuel cell system disclosed in Japanese Laid-Open Patent Application No. 2005-166439, the anode off-gas discharged from the anode is burned and the fuel cell is heated by the air that has been increased in temperature by the heat of the gas, but the heat of the exhaust gas discharged from the cathode has not been utilized. Also a concern exists that carbon deposition may be caused in the anode by supplying rich combustion gas having a comparatively low temperature to the anode. This configuration does not take into account this carbon deposition.

One object of the present disclosure is to provide a fuel cell system and/or method whereby the heat from the exhaust gas that is discharged from the cathode is effectively utilized to raise the temperature of the fuel cell while avoiding partial damage and other problems caused by the temperature changes, and to prevent carbon deposition in the anode.

In view of the state of the known technology, one aspect of the present disclosure is to provide a fuel cell system that at basically comprises a fuel cell, a first combustor, a second combustor, a first heating gas return channel, a second heating gas return channel and a gas supplier. The fuel cell includes a solid electrolyte cell with an anode and a cathode. The fuel cell is configured to generate power by reacting a hydrogen-containing gas and an oxygen-containing gas. The first combustor is arranged to selectively supply a heating gas to the cathode of the fuel cell. The second combustor is arranged to selectively supply a heating gas to the anode of the fuel cell. The first heating gas return channel is arranged to mix at least some exhaust gas discharged from the cathode with the heating gas from the first combustor such that a mixed heating gas of the exhaust gas from the cathode and the heating gas from the first combustor is supplied to the cathode. The second heating gas return channel is arranged to mix at least some exhaust gas discharged from the cathode with the heating gas from the second combustor such that a mixed heating gas of the exhaust gas from the cathode and the heating gas from the second combustor is supplied to the anode. The gas supplier is connected to the first heating gas return channel for supplying the exhaust gas from the cathode to mix with the heating gas of the first combustor.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
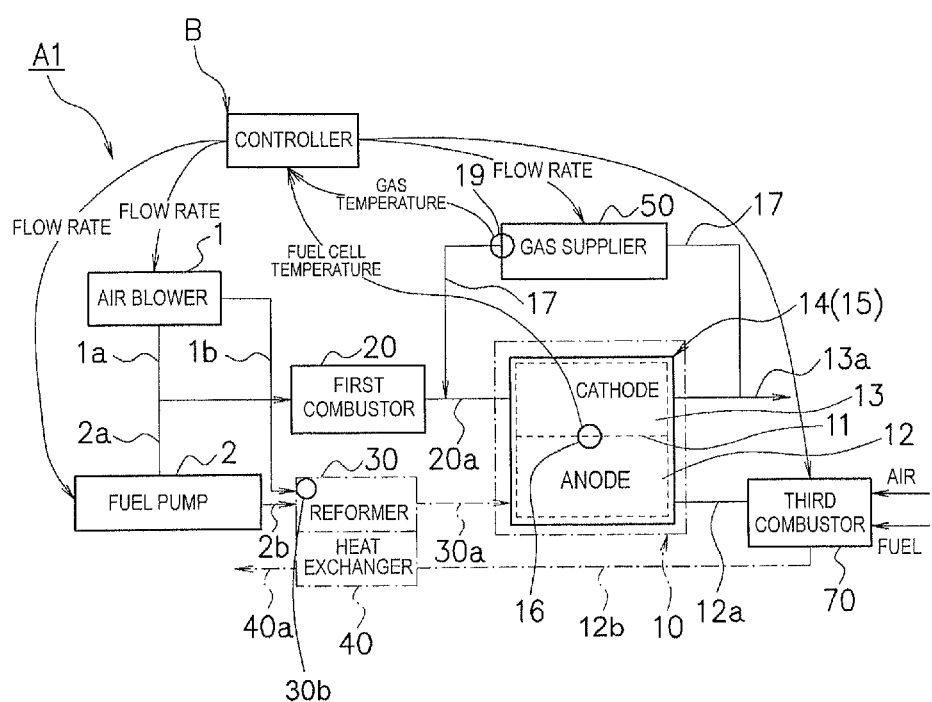
FIG. 1 is a schematic block diagram of a configuration of a fuel cell system according to a first embodiment.

Referring initially to FIG. 1, a schematic block diagram of a fuel cell system A1 is illustrated in accordance with a first embodiment. As seen in FIG. 1, the fuel cell system A1 includes, among other things, a controller B, an air blower 1, a fuel pump 2 and a fuel cell 10. In the illustrated embodiment, the fuel cell 10 is a solid oxide fuel cell (SOFC) in which an oxygen ion conductor (oxide ion conductor) is used as an electrolyte 11. In the illustrated embodiment, the electrolyte 11 has an anode 12 provided on one side of the electrolyte 11 and a cathode 13 provided on the other side of the electrolyte 11. In the illustrated embodiment, the electrolyte 11 has a plurality of solid electrolyte cells 14 with the anode 12 and the cathode 13 being located on opposite sides of the solid electrolyte cells 14. Specifically, in the illustrated embodiment, the solid electrolyte cells 14 are stacked to form a cell stack 15 with the anode 12 and the cathode 13 being located on opposite sides of the cell stack 15. For the sake of illustration, the cell stack 15 is depicted in a simplified manner in FIG. 1 by showing only a single cell of the solid electrolyte cells 14. A temperature sensor 16 is disposed in the cell stack 15 for acquiring temperature data of the cell stack 15. The temperature data acquired by the temperature sensor 16 is inputted to the controller B.

Generally speaking, power in the fuel cell 10 is generated by reacting the fuel gas with the air. The solid electrolyte cells 14 is an electric power generation system that generates electric power by separately supplying hydrogen-containing gas, serving as fuel, and oxygen-containing gas, serving as oxidizer to allow electrochemical reaction to take place in the fuel cell. In particular, in the illustrated embodiment, the fuel cell system A1 can use, for example, "ethane, butane, natural gas, and other suitable gases" as the "hydrogen-containing gas" that is supplied as fuel to the anode 12. It is preferable to use ethanol, butanol, or another alcohol. However, in cases of the fuel cell system A1 being used in vehicles such as automobiles or other mobile units, gasoline, diesel oil, light oil, or another liquid fuel, can be particularly useful in such cases. However, the fuel is not limited to these examples. Also, in the illustrated embodiment, the fuel cell system A1 uses "air" as an example of the "oxygen-containing gas" that is supplied to the as oxidizing gas to the cathode 13.

Figure 2:
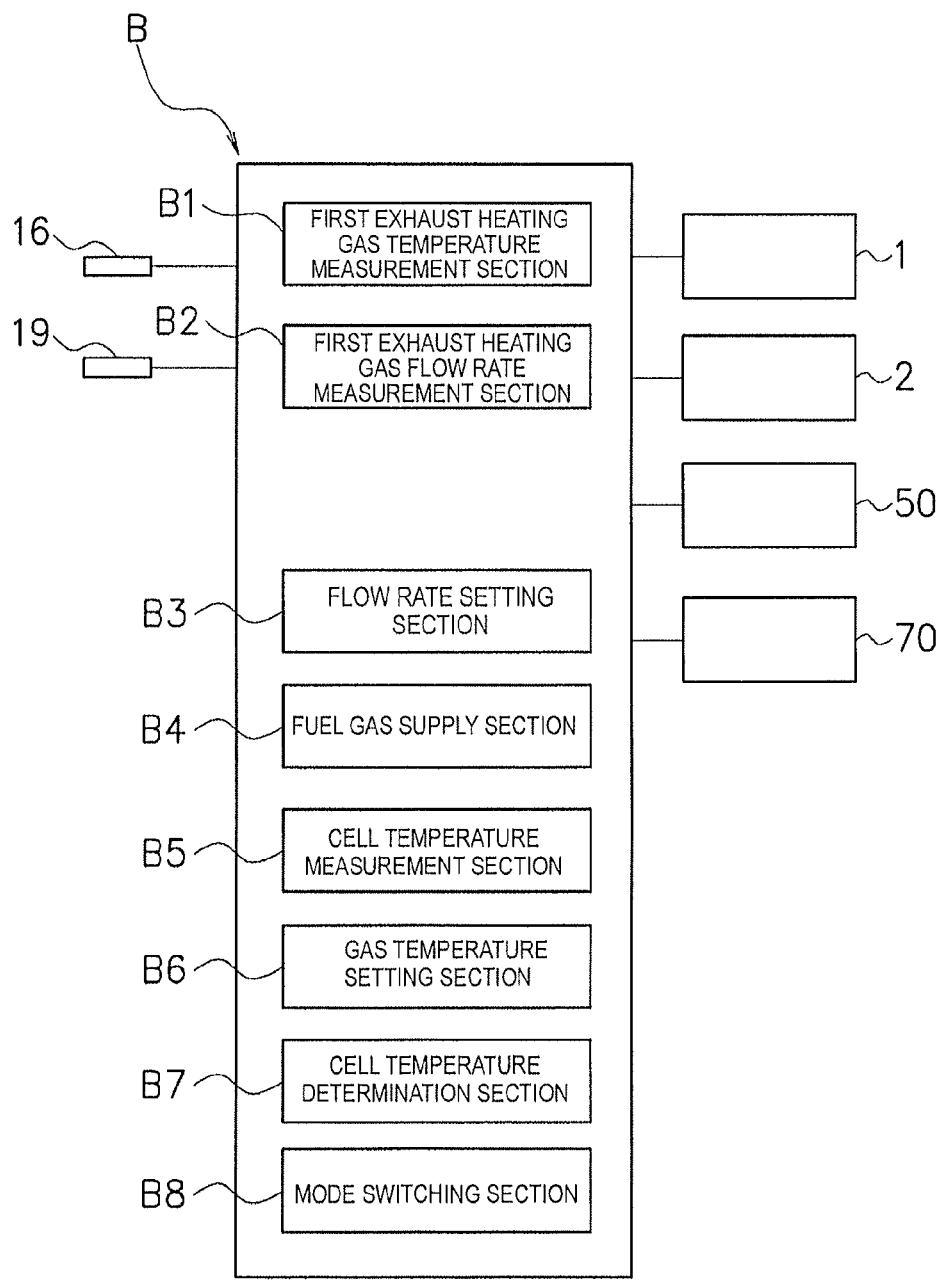
FIG. 2 is a schematic block diagram of a controller of the fuel cell system according to the first embodiment.

As also seen in FIG. 1, the fuel cell system A1 includes, among other things, a first combustor 20, a reformer 30, a heat exchanger 40, a gas supplier 50 and a third combustor 70. The air blower 1 is configured and arranged to supply fresh oxygen-containing gas to the first combustor 20 and the reformer 30. The fuel pump 2 is configured and arranged to supply fuel to the first combustor 20. The rotational speeds of the air blower 1 and the fuel pump 2 are controlled by the controller B so as to increase and decrease their rotational speeds as needed. The controller B of the fuel cell system illustrated in FIG. 1 is schematically illustrated in FIG. 2. In the illustrated embodiment, as discussed below, exhaust gas discharged from the anode 12 of the fuel cell system A1 is effectively utilized to raise the temperature the fuel cell 10 while avoiding partial damage and other problems caused by temperature changes in the fuel cell 10, and preventing carbon deposition.

The first combustor 20 performs the function of producing high-temperature heating gas. The high-temperature heating gas is produced by mixing and burning a fuel-air mixture. The air is supplied to the first combustor 20 through a supply pipe 1a that is fluidly connected between the intake side of the first combustor 20 and the air blower 1. The fuel is supplied to the first combustor 20 through a supply pipe 2a that is fluidly connected between the intake side of the first combustor 20 and the fuel pump 2.

On the discharge side of the first combustor 20, a supply pipe 20a is fluidly connected between the discharge side and the intake side of the cathode 13 of the fuel cell 10. The supply pipe 20a is designed to supply the heating gas produced by the first combustor 20 to the cathode 13. On the discharge side of the cathode 13 is disposed a discharge pipe 13a for discharging the exhaust heating gas discharged from the cathode 13 out of the fuel cell system A1. Spanning between the supply pipe 20a and the discharge pipe 13a is a return channel or pipe 17. In this embodiment, the return pipe 17 constitutes a first exhaust heating gas return channel. The return pipe 17 is configured and arranged for mixing some of the exhaust heating gas discharged from the cathode 13 with heating gas supplied from the first combustor 20 to the cathode 13. Specifically, the return starting end of the return pipe 17 is interconnected with the discharge pipe 13a, and the return terminal end is interconnected with the supply pipe 20a. The gas supplier 50 is disposed in the return channel 17. The gas supplier 50 performs the function of supplying exhaust heating gas flowing into the return pipe 17 to the cathode 13. In the present embodiment, the gas supplier 50 is an air blower. Specifically, mixed heating gas is produced by mixing the exhaust heating gas discharged from the cathode 13 with the heating gas supplied from the first combustor 20, and the resulting mixed heating gas is supplied to the cathode 13 by the return pipe 17 and the gas supplier 50. A temperature sensor 19 is disposed in the gas supplier 50 for acquiring temperature data of the exhaust heating gas supplied from the gas supplier 50. The temperature data acquired by this temperature sensor 19 is inputted to the controller B.

The reformer 30 is configured and arranged for reforming fuel gas supplied to the anode 12 of the fuel cell 10 in a normal operation mode described hereinafter. A supply pipe 2b is fluidly connected between the intake side of the reformer 30 and the outlet side of the fuel pump 2 for supplying fuel to the reformer 30. A supply pipe 1b is fluidly connected between the intake side of the reformer 30 and the air blower 1 for supplying air to the reformer 30. A supply pipe 30a is fluidly connected between the supply side of the reformer 30 and the intake side of the anode 12 such that reformed fuel gas supplied from the reformer 30 is supplied to the anode 12. The reformer 30 can be provided with a temperature sensor 30b for acquiring temperature data of the reformer 30 as needed and/or desired.

On the discharge side of the anode 12 is disposed a discharge pipe 12a for supplying discharged exhaust fuel gas to the third combustor 70. The third combustor 70 performs the function of producing high-temperature heating gas by mixing and burning an air-fuel mixture of fuel and either fresh air or exhaust heating gas discharged from the anode 12. The discharge pipe 12a is fluidly connected between the intake side of the third combustor 70 and the discharge side of the anode 12. Between the discharge side of the third combustor 70 and the intake side of the heat exchanger 40 is disposed a supply pipe 12b, which is a heating gas supply channel for supplying the heating gas produced by the third combustor 70 to the heat exchanger 40.

The heat exchanger 40 is disposed adjacent to the reformer 30 so that heat exchange occurs between them. The heat exchanger 40 is designed to be supplied with some of the combustion gas resulting from the exhaust fuel gas supplied from the anode 12 through the supply pipe 12b being burned by the third combustor 70. On the discharge side of the heat exchanger 40 is disposed a discharge pipe 40a for discharging exhaust fuel gas out of the system after the gas has been used in heat exchange.

In the present embodiment, during a temperature increase for raising the temperature of the fuel cell 10 to an operable temperature (during startup or temperature-raising mode), the reformer 30, the heat exchanger 40, and the third combustor described above do not operate, and fuel gas is not supplied to the anode 12. Thus, the temperature-raising mode is only performed up until the temperature of the fuel cell 10 reaches its prescribed operating temperature.

In the illustrated embodiment, the controller B includes a microcomputer with a CPU (central processing unit), an interface circuit, storage devices such as a ROM (Read Only Memory) device and a RAM (Random Access Memory) device and other conventional components (not shown). The microcomputer of the controller B is programmed to control the other components of the fuel cell system A1 as discussed below. The memory circuit stores processing results and control programs that are run by the processor circuit. The internal RAM of the controller B stores statuses of operational flags and various control data. The internal ROM of the controller B stores various prescribed data for various operations.

The controller B includes one or more programs that are used in operation of the fuel cell system A1. By executing these programs, the controller B performs the following functions: (1) measuring the temperature of the exhaust heating gas flowing through the return pipe 17; (2) measuring the flow rate of exhaust heating gas flowing through the return pipe 17; (3) setting the fuel and air flow rates of the fuel and the air supplied to the first combustor 20 based on the flow rate and temperature of the exhaust heating gas flowing through the return pipe 17, so that the heating gas supplied to the cathode 13 reaches a predetermined temperature; (4) supplying fuel and oxygen-containing gas with a set flow rate to the first combustor 20; (5) measuring the temperature of the fuel cell 10; (6) setting the temperature of the heating gas supplied to the cathode 13 of the fuel cell 10 on the basis of the temperatures of the exhaust heating gas flowing through the fuel cell 10 and the return pipe 17; (7) determining whether or not the temperature of the fuel cell 10 has reached a predetermined value; and (8) switching from temperature-raising mode to normal operation mode when temperature of the fuel cell 10 is determined to have reached the predetermined value. It will be apparent to those skilled in the art from this disclosure that the precise structure and algorithms for the controller B can be any combination of hardware and/or software that will carry out the described functions.

The programming and/or hardware of the controller B used to perform the function of measuring the temperature of the exhaust heating gas flowing through the return pipe 17 is referred to as a "first exhaust heating gas temperature measurement section B1." In the present embodiment, the temperature of the exhaust heating gas is measured based on the temperature data acquired by the temperature sensor 19. The programming and/or hardware of the controller B used to perform the function of measuring the flow rate of exhaust heating gas flowing through the return pipe 17 is referred to as the "first exhaust heating gas flow rate measurement section B2." The first exhaust heating gas flow rate measurement section B2 measures the gas flow rate of the exhaust heating gas from the rotational speed of the blower and the quantity of gas that can be blown by one rotation of the blower, according to the design of the gas supplier 50. The programming and/or hardware of the controller B used to perform the function of setting the flow rates of the fuel and the air supplied to the first combustor 20 is referred to as the "flow rate setting section B3." The term "predetermined temperature" refers to a temperature at which the fuel cell 10 will not be damaged by thermal shock, based on the current temperature of the fuel cell 10. The programming and/or hardware of the controller B used to perform the function of supplying fuel and oxygen-containing gas with a set flow rate to the first combustor 20 is referred to as the "fuel gas supply section B4." In the present embodiment, supply is performed by rotatably and drivably controlling the air blower 1 and the fuel pump 2. The programming and/or hardware of the controller B used to perform the function of measuring the temperature of the fuel cell 10 is referred to as the "cell temperature measurement section B5." In the present embodiment, the temperature of the fuel cell 10 is measured based on the temperature data acquired by the temperature sensor 16. The programming and/or hardware of the controller B used to perform the function of setting the temperature of the heating gas supplied to the cathode 13 is referred to as the "gas temperature setting section B6." In the present embodiment, the temperature of the heating gas is set to increase over time to a target temperature. The programming and/or hardware of the controller B used to perform the function of determining whether or not the temperature of the fuel cell 10 has reached a predetermined value is referred to as the "cell temperature determination section B7." The programming and/or hardware of the controller B used to perform the function of switching from temperature-raising mode to normal operation mode when temperature of the fuel cell 10 is determined to have reached the predetermined value is referred to as the "mode switching section B8."

As used herein, the term "temperature-raising mode" refers to the action of raising the temperature of the fuel cell 10 to an operable temperature as described above. As used herein, the term "normal operation mode" refers to an operation state in the fuel cell 10 has reached the operable temperature for inducing power generation in the fuel cell 10.

Figure 3:
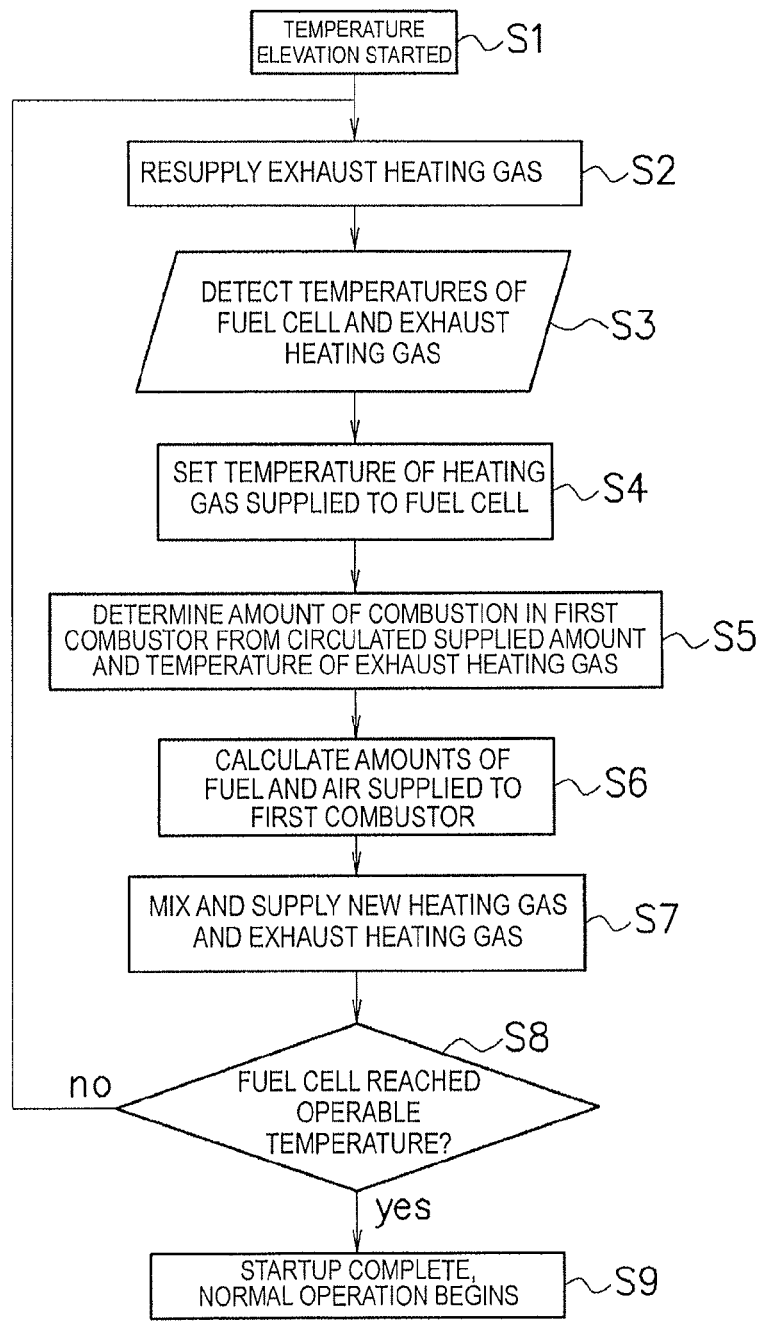
FIG. 3 is a flowchart of a fuel cell temperature-raising method executed by the controller of the fuel cell used in the fuel cell system according to the first embodiment.

The temperature-raising method of the fuel cell used in the fuel cell system A1 having the configuration described above is described with reference to FIG. 3. FIG. 3 is a flowchart showing the temperature-raising method of the fuel cell used in the fuel cell system A1. The temperature-raising method used in the fuel cell system A1 includes at least measuring the temperature of the exhaust heating gas flowing through the first exhaust heating gas return channel or pipe 17, setting the flow rates of the oxygen-containing gas and the fuel burned by the first combustor 20 so that the new heating gas supplied from the first combustor 20 to the cathode 13 reaches a predetermined temperature, and supplying the fuel and oxygen-containing gas having set flow rates to the first combustor 20. The details thereof are as follows.

Referring to the flow chart of FIG. 3, the process will now be discussed. In step S1, the process of raising the temperature of the fuel cell 10 for a startup operation is started, and then the process advances to step S2.

In step S2, the exhaust heating gas (exhaust lean combustion gas) discharged from the cathode 13 is passed through the return pipe 17, with the circulating return supply being performed at a constant flow rate.

Predetermined amounts of fuel and air are supplied to and burned in the first combustor 20 to produce new heating gas, which mixes with the exhaust heating gas supplied back through the return pipe 17 to produce mixed heating gas of a predetermined temperature, which is supplied to the cathode 13.

In step S3, the temperature of the exhaust heating gas circulated through the return pipe 17 is measured and the temperature of the fuel cell 10 is measured.

In step S4, the temperature of the new heating gas supplied to the fuel cell 10 is set. At this time, the heating gas of a predetermined temperature is set to a temperature at which the fuel cell 10 described above is not damaged by thermal shock, based on the current temperature of the fuel cell 10. This predetermined temperature is appropriately set in view of the heat capacity of the fuel cell 10 and the flow rate of the supplied heating gas, i.e., the heat capacity of the heating gas.

In step S5, the amount of heat needed in order to raise the temperature of the fuel cell 10 to the predetermined temperature is calculated from the flow rate and specific heat of the exhaust heating gas circulated back, and the flow rates of the fuel and air needed in the first combustor 20 in order to produce this amount of heat are determined. Since the heating gas is supplied to the cathode 13, the heating gas is preferably a lean combustion gas having oxidative properties. Specifically, the gas undergoes lean combustion at an air-fuel ratio of 1 to 1.2.

In step S6, the amounts of fuel and air calculated above are supplied to the first combustor 20.

In step S7, the heating gas produced by the first combustor 20 is mixed with the exhaust heating gas, and heating gas (mixed heating gas) of a predetermined temperature is supplied to the fuel cell 1. This mixed heating gas thereby raises the temperature of the fuel cell 10.

As previously described, since the temperature of the heating gas supplied to the fuel cell 10 is set according to the temperature of the fuel cell 10, the temperature of the fuel cell 10 is raised and the temperature of the supplied heating gas is also gradually set to a progressively higher temperature. The temperature of the mixed heating gas supplied to the fuel cell 10 is assigned an upper limit temperature in consideration of the heat resistance of the structural members. For example, in the present embodiment, the upper limit temperature is 800° C. Specifically, the set temperature of the heating gas gradually increases up to 800° C., after which the temperature of the heating gas supplied to the fuel cell 10 will be continued to be maintained at 800° C.

The exhaust heating gas discharged from the fuel cell 10 provides heat to the fuel cell 10, and the gas is also discharged at approximately the same temperature as the fuel cell 10. Therefore, since the temperature of the circulating exhaust heating gas rises along with the temperature increase in the fuel cell 10, the amount of combustion in the first combustor 20 is regulated according to the difference between the set temperature of the heating gas supplied to the fuel cell 10 and the temperature of the circulating exhaust heating gas, the amount of the heating gas mixing with the circulating exhaust heating gas, and the amount of the mixed gas being supplied to the fuel cell 10. In this way, the heating gas is supplied to raise the temperature of the fuel cell 10 until the fuel cell 10 reaches an operable temperature.

In step S8, a decision is made as to whether or not the fuel cell 10 has reached the operable temperature. Once it has been determined that the operable temperature of the fuel cell 10 has been reached, the process advances to step S9. Otherwise, the process returns to step S2 until the operable temperature of the fuel cell 10 has been reached.

In step S9, the heating temperature-raising operation is ended, and the normal operation mode is reinstated. According to the configuration described above, since circulated fuel gas (exhaust heating gas) is discharged from the cathode at room temperature or higher, a lesser amount of heat, i.e., a lesser amount of burned fuel is needed in order to produce the fuel gas at the same flow rate in comparison with using new or fresh air as the normal secondary air. Thus, fuel consumption during temperature elevation can be greatly reduced.

To consider utilizing waste heat, it would be possible to recover only waste heat with the heat exchanger without circulating exhaust fuel gas. However, since the heat exchanger itself has a low temperature during a temperature elevation process, first a certain amount of heat will be used to heat up the heat exchanger. If a startup operation is presumed to occur suddenly (i.e., the temperature rises suddenly), a large amount of combustion gas will be supplied to the fuel cell, and an extremely large heat exchanger will be needed in order to recover waste heat from the large amount of combustion gas. Therefore, the heat capacity of the heat exchanger increases, and even if the heat exchanger is utilized for the purpose of recovering waste heat during temperature elevation, the recovery rate of waste heat will not increase because of the amount of heat required to preheat the heat exchanger.

Figure 4:
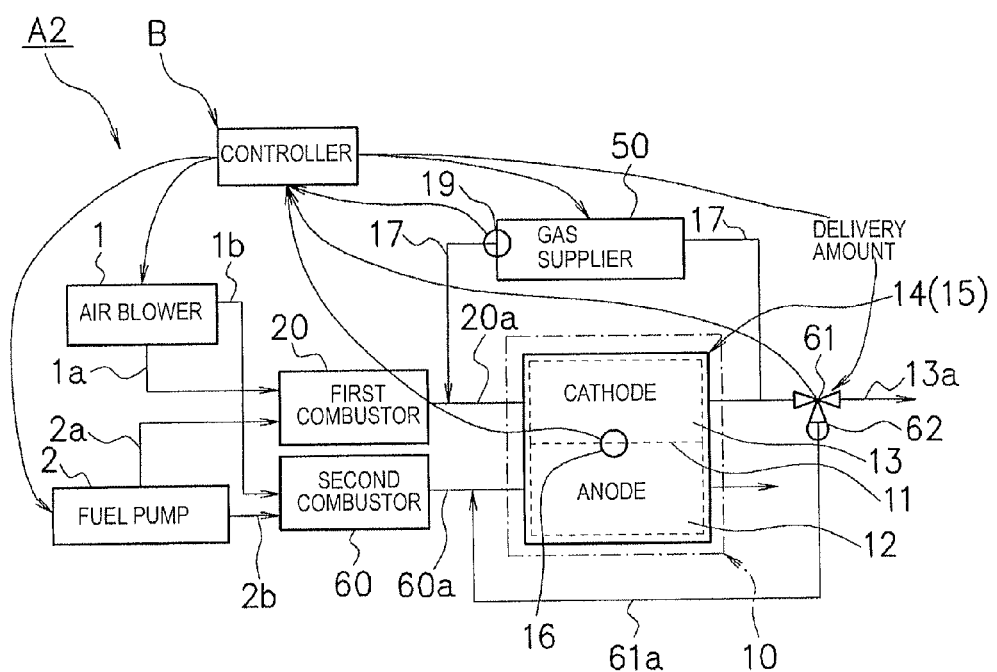
FIG. 4 is a schematic block diagram of a configuration of a fuel cell system according to a second embodiment.
Figure 5:
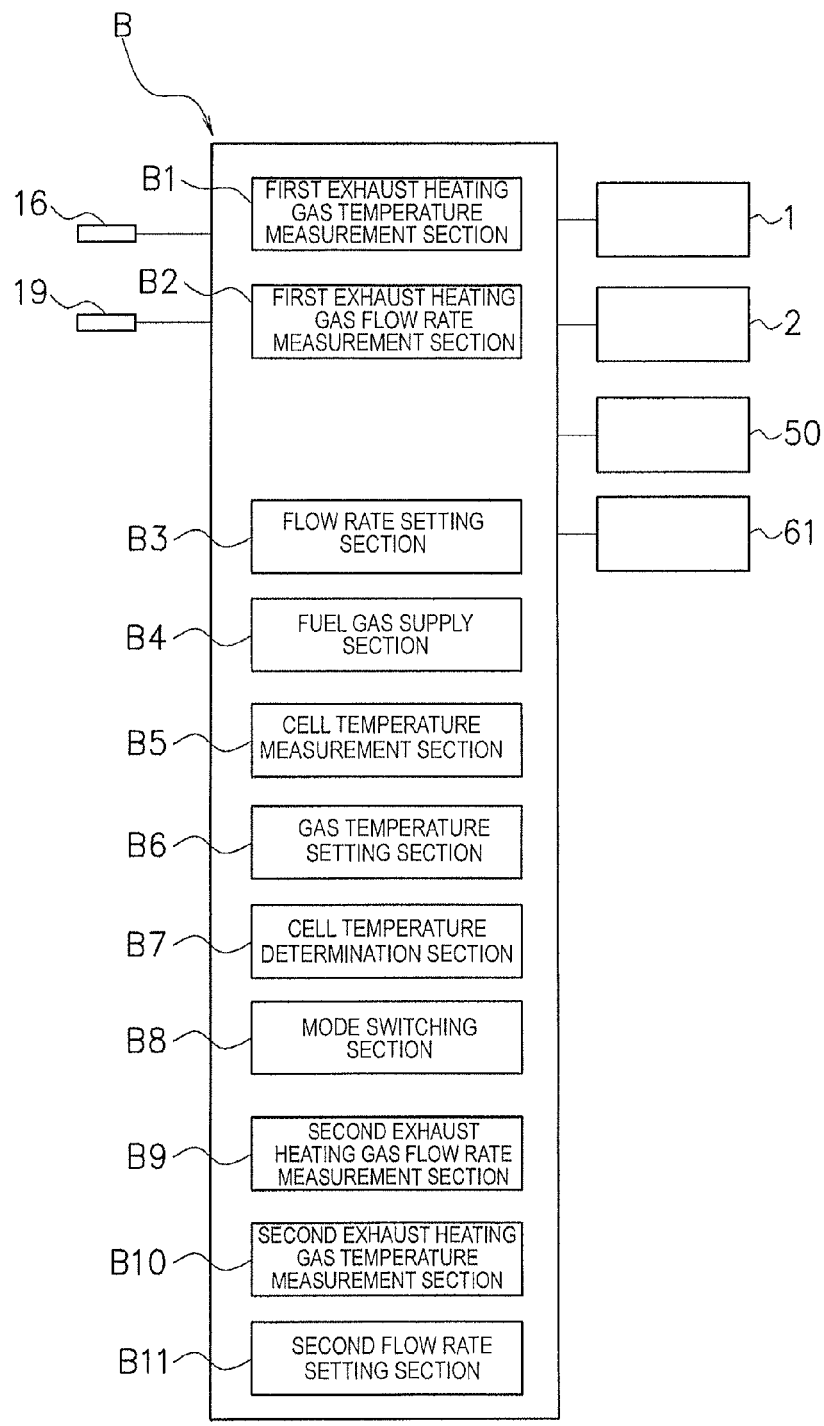
FIG. 5 is a schematic block diagram of a controller of the fuel cell system according to the second embodiment.
Figure 6:
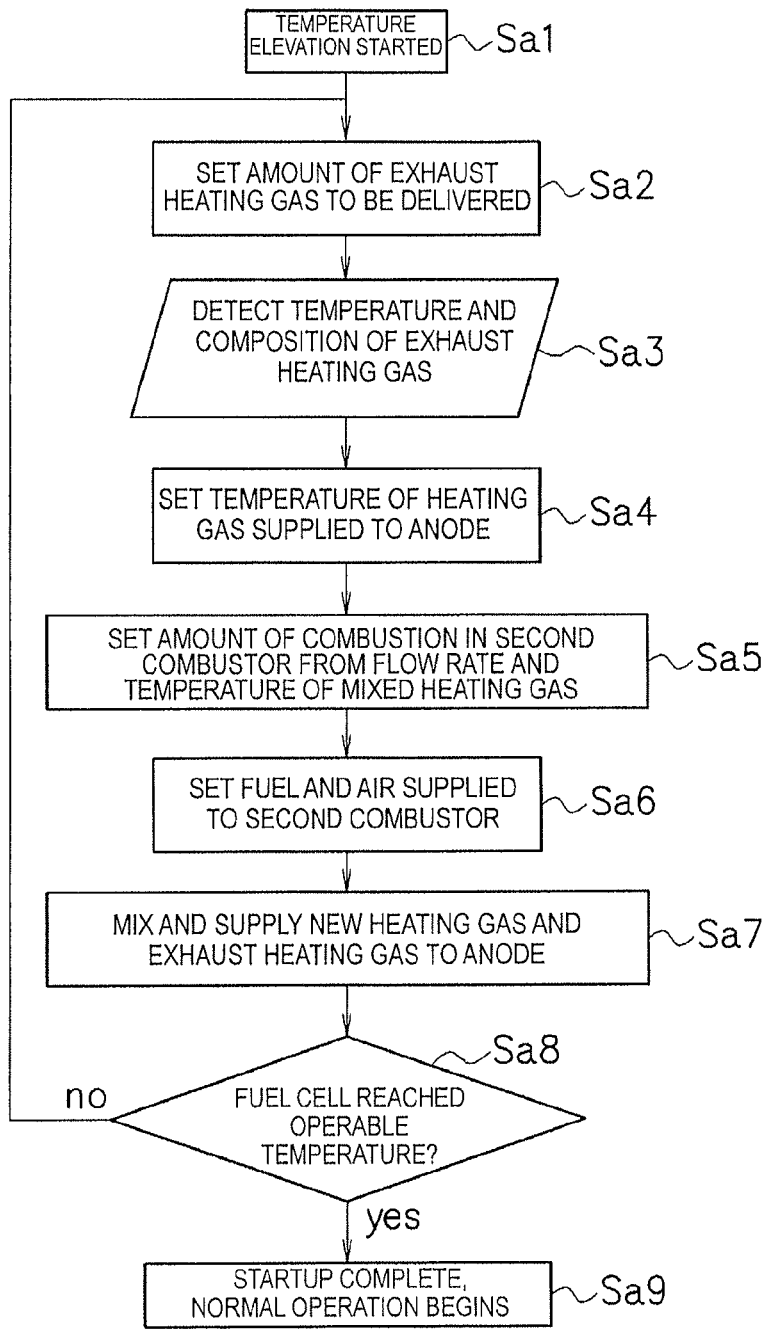
FIG. 6 is a flowchart of a fuel cell temperature-raising method executed by the controller of the fuel cell used in the fuel cell system according to the second embodiment.

Referring now to FIGS. 4 to 6, a fuel cell system A2 in accordance with a second embodiment will now be explained. In view of the similarity between the first and second embodiments, the parts of the fuel cell system A2 of the second embodiment that are identical to the parts of the first embodiment will be given the same reference symbols as the parts of the first embodiment. Moreover, the descriptions of the parts of the second embodiment that are identical to the parts of the first embodiment have been omitted for the sake of brevity. FIG. 4 is a schematic block diagram showing the configuration of the fuel cell system A2 according to the second embodiment. FIG. 5 is a schematic block diagram showing the functions of the controller B constituting part of the fuel cell system A2 according to the second embodiment. FIG. 6 is a flowchart showing the method of raising the temperature of the fuel cell 10 that is used in the fuel cell system A2. In addition to the configuration shown in the fuel cell system A1 according to the first embodiment described above, the fuel cell system A2 according to the second embodiment also includes a second combustor 60, a flow rate regulation valve 61 and a temperature sensor 62. Also the reformer 30, the heat exchanger 40, and the third combustor 70 are not used in this embodiment.

The second combustor 60 performs the function of producing high-temperature heating gas. The second combustor 60 mixes and burning the air supplied through the supply pipe 1b from the air blower 1 with the fuel supplied through the supply pipe 2b from the fuel pump 2 to produce the high-temperature heating gas. On the discharge side of the second combustor 60 is fluidly connected to a supply pipe 60a for supplying the produced heating gas to the anode 12 of the fuel cell 10. The flow rate regulation valve 61 is disposed in the supply pipe 13a. A return channel or pipe 61a is fluidly connected between the flow rate regulation valve 61 and the supply pipe 60a. In this embodiment, the return pipe 61a constitutes a second exhaust heating gas return channel.

The flow rate regulation valve 61 is operatively connected to the output side of the controller B so that the controller B selectively opens and closes the flow rate regulation valve 61. Specifically, according to an open/close drive signal outputted from the controller B, the flow rate regulation valve 61 directs an appropriate amount of the exhaust heating gas to flow through the return pipe 61a. More specifically, the return pipe 61a is formed in order to circulate exhaust heating gas discharged from the cathode 13 to the anode 12. In particular, at least some of the excess exhaust heating gas is not circulated back to the cathode 13 and redirected to mix with the heating gas produced by the second combustor 60. In this way, a mixture of the exhaust heating gas discharged from the cathode 13 and the heating gas produced by the second combustor 60 are introduced into the anode 12.

The temperature sensor 62 is used to acquire temperature data of exhaust heating gas flowing through the return pipe 61a. The temperature sensor 62 is connected to the input side of the controller B. In other words, acquired temperature data of exhaust heating gas flowing through the return pipe 61a is inputted into the controller B.

In this embodiment, the controller B includes one or more programs that are used in operation of the fuel cell system A2. Similar to the first embodiment as discussed above, by executing these programs, the controller B performs the functions of the first exhaust heating gas temperature measurement section B1, the first exhaust heating gas flow rate measurement section B2, the flow rate setting section B3, the fuel gas supply section B4, the cell temperature measurement section B5, the gas temperature setting section B6, the cell temperature determination section B7 and the mode switching section B8. However, in this embodiment, in addition to theses functions, the controller B also performs the following functions: (1) measuring the flow rate of the exhaust heating gas supplied to the anode 12; (2) measuring the temperature of the exhaust heating gas; and (3) setting the flow rates of the fuel and air burned in the second combustor 60 so that a steam (e.g., water vapor) to carbon ratio (S/C ratio) and the temperature of the fuel gas supplied to the anode 12 reach predetermined values based on the flow rate and temperature of the exhaust heating gas discharged from the cathode 13 and supplied to the anode 12.

The programming and/or hardware of the controller B used to perform the function of measuring the flow rate of the exhaust heating gas supplied to the anode 12 through the return pipe 61a is referred to as the "second exhaust heating gas flow rate measurement section B9." The programming and/or hardware of the controller B used to perform the function of measuring the temperature of the exhaust heating gas flowing through the return pipe 61a is referred to as the "second exhaust heating gas temperature measurement section B10." The programming and/or hardware of the controller B used to perform the function of setting the flow rates of the fuel and air burned in the second combustor 60 so that the S/C ratio and the temperature of the fuel gas supplied to the anode 12 reach predetermined values is referred to as the "second flow rate setting section B11."

The method of raising the temperature of a fuel cell using the fuel cell system A2 having the configuration described above is described with reference to FIG. 6. FIG. 6 is a flowchart showing the method of raising the temperature of the fuel cell used in the fuel cell system A2.

In the present embodiment, the flow rates of the fuel and the air supplied to the first combustor 20 are regulated so that the mixed heating gas supplied to the cathode 13 reach a predetermined temperature based on the flow rate and temperature of the exhaust heating gas flowing through the return pipe 17, which is similar to the fuel cell system A1 described above.

In step Sa1, the process of raising the temperature of the fuel cell 10 for a startup operation is started, and the process advances to step Sa2.

In step Sa2, the flow rate is set for the delivery of exhaust heating gas (exhaust lean combustion gas) discharged from the cathode 13 to the return pipe 61a. Specifically, the exhaust heating gas supplied to the anode 12 has oxidation reducing properties in order to prevent oxidation of the anode 12. The reducing exhaust heating gas is provided with a certain amount of water vapor so as not to cause carbon deposition on the anode 12. The reducing exhaust heating gas is also supplied while being adjusted to a predetermined temperature so as not to cause thermal shock in the fuel cell 10. To accomplish these results, exhaust heating gas discharged from the cathode 13 without being recirculated through the cathode 13 is used.

As described above, the exhaust heating gas flowing in the return pipe 61a has a low oxygen concentration. By mixing the exhaust heating gas of the return pipe 61a with new heating gas produced from rich combustion in the second combustor 60 prior being introduced into the anode 12, the resulting mixed heating gas will have oxidation reducing properties. Since the exhaust heating gas discharged from the cathode 13 also contains a high concentration of water vapor, it is possible to provide a water vapor concentration sufficient to prevent carbon deposition caused by the mixed heating gas in the anode 12. By using the exhaust heating gas supplied from the cathode 13 as the temperature-regulating gas of the new heating gas produced by the second combustor 60, it is possible to supply the anode 12 with exhaust heating gas that has reducing properties, no risk of carbon deposition, and also the desired temperature. It is also possible to appropriately set the delivered amount of excess exhaust heating gas discharged without being circulated through the return pipe 17. To prevent oxidation of the anode 12, fuel gas having the minimum required reducing properties is preferably supplied. Thus, the flow rate of exhaust heating gas supplied from the cathode 13 is preferably set to a small amount. Furthermore, in cases in which the temperature of the fuel cell 10 is raised suddenly, the supply of a large amount of heating gas is efficient to the anode 12 as well, and the flow rate of exhaust heating gas supplied from the cathode 13, is therefore set to a high rate.

As with cases with the cathode 13, the amount of combustion in the second combustor 60 needed in order to raise the temperature of the exhaust heating gas supplied from the cathode 13 to the predetermined temperature is set based on the predetermined temperature of the heating gas supplied to the fuel cell 10. The predetermined temperature of the heating gas supplied to the anode 12 can be set independent of the cathode 13, but is preferably set to approximately the same set temperature as the cathode 13 in order to avoid thermal shock to the fuel cell 10. The amount of combustion in the second combustor 60 is set according to the amount of heat needed to raise the temperature of the exhaust heating gas supplied from the cathode 13. The amount of combustion in the second combustor 60 is also set in view of the composition of the mixed heating gas. Specifically, in order for the mixed heating gas to have reducing properties, consideration is given to how much unburned fuel is to be included, and also to how much water vapor is needed in the unburned fuel in order to prevent carbon deposition. Therefore, rich combustion is performed in the second combustor 60, but combustion is performed with the air-to-fuel ratio kept between less than 1 and the combustion limit (about 0.2 in the case of gasoline).

As described above, the exhaust heating gas that does not circulate through the return pipe 17 is mixed with the new heating gas produced by the second combustor 60 disposed on the upstream side of the anode 12 until the fuel cell 10 reached the predetermined temperature. In this way, heating gas having a temperature that does not cause thermal shock to the fuel cell 10 and which has reducing properties that eliminate the risk of carbon deposition in the cathode 13 is supplied to the fuel cell 10 to raise the temperature.

In step Sa3, the temperature and composition of the exhaust heating gas discharged from the cathode 13 and directed toward the anode 12 are detected, measured and stored. In the present embodiment, the temperature of exhaust heating gas directed toward the anode 12 is detected by the temperature sensor 62. The temperature sensor 62 is disposed in the flow rate regulation valve 61, but the temperature detected by the temperature sensor 19 disposed on the discharge side of the gas supplier 50 can be used as a substitute for the temperature sensor 62.

The flow rate regulation valve 61 includes a measuring device for measuring the composition of the exhaust heating gas. The composition of the exhaust heating gas is measured by this measuring device. However, the composition can also be estimated from the combustion conditions (air-to-fuel ratio) in the first combustor 20 because the composition gradually approaches the heating gas composition produced in the first combustor 20 as described above. In other words, a configuration can be used in which a gas composition estimation section is provided for estimating the composition of the exhaust heating gas on the basis of the combustion conditions (air-to-fuel ratio) in the first combustor 20.

In step Sa4, the temperature of the heating gas supplied to the anode 12 is set.

In step Sa5, the amount of combustion in the second combustor 60 is set based on the flow rate and temperature of the exhaust heating gas.

In step Sa6, fuel and air are supplied to the second combustor 60.

In step Sa7, new heating gas supplied from the second combustor 60 and exhaust heating gas discharged from the cathode 13 are mixed and supplied to the anode 12.

In step Sa8, a decision is made as to whether or not the fuel cell 10 has reached the operable temperature. Once the operable temperature is determined to have been reached, the process advances to step Sa9. Otherwise, if the operable temperature has not been reached, then the process returns to step Sa2.

In step Sa9, the heating and temperature-raising operation is ended, and the system transitions to the normal operation mode.

Figure 7:
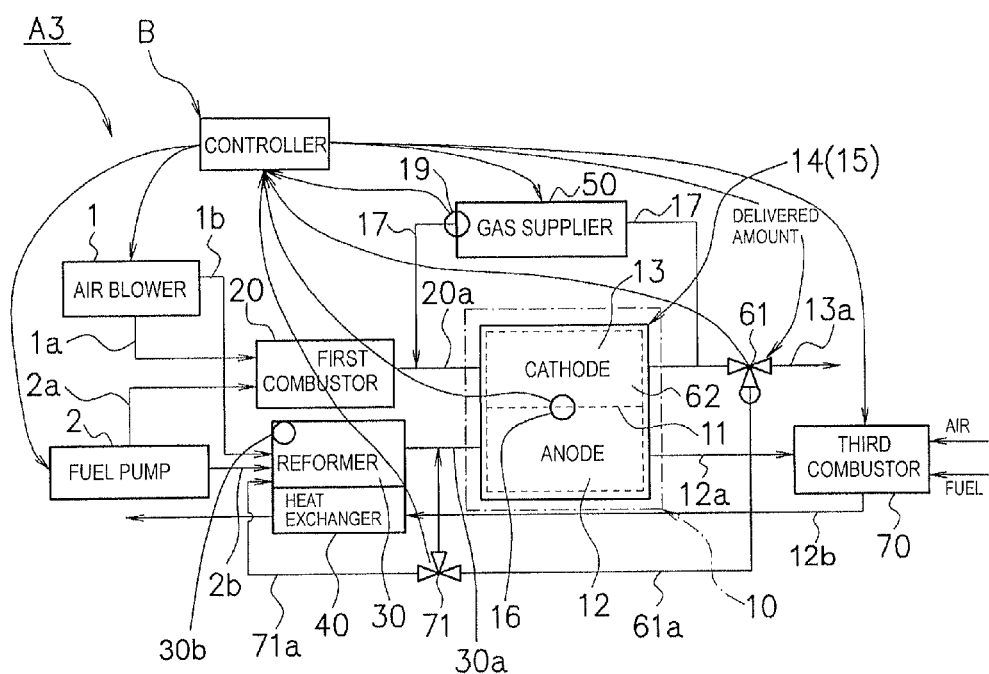
FIG. 7 is a schematic block diagram of a configuration of a fuel cell system according to a third embodiment.
Figure 8:
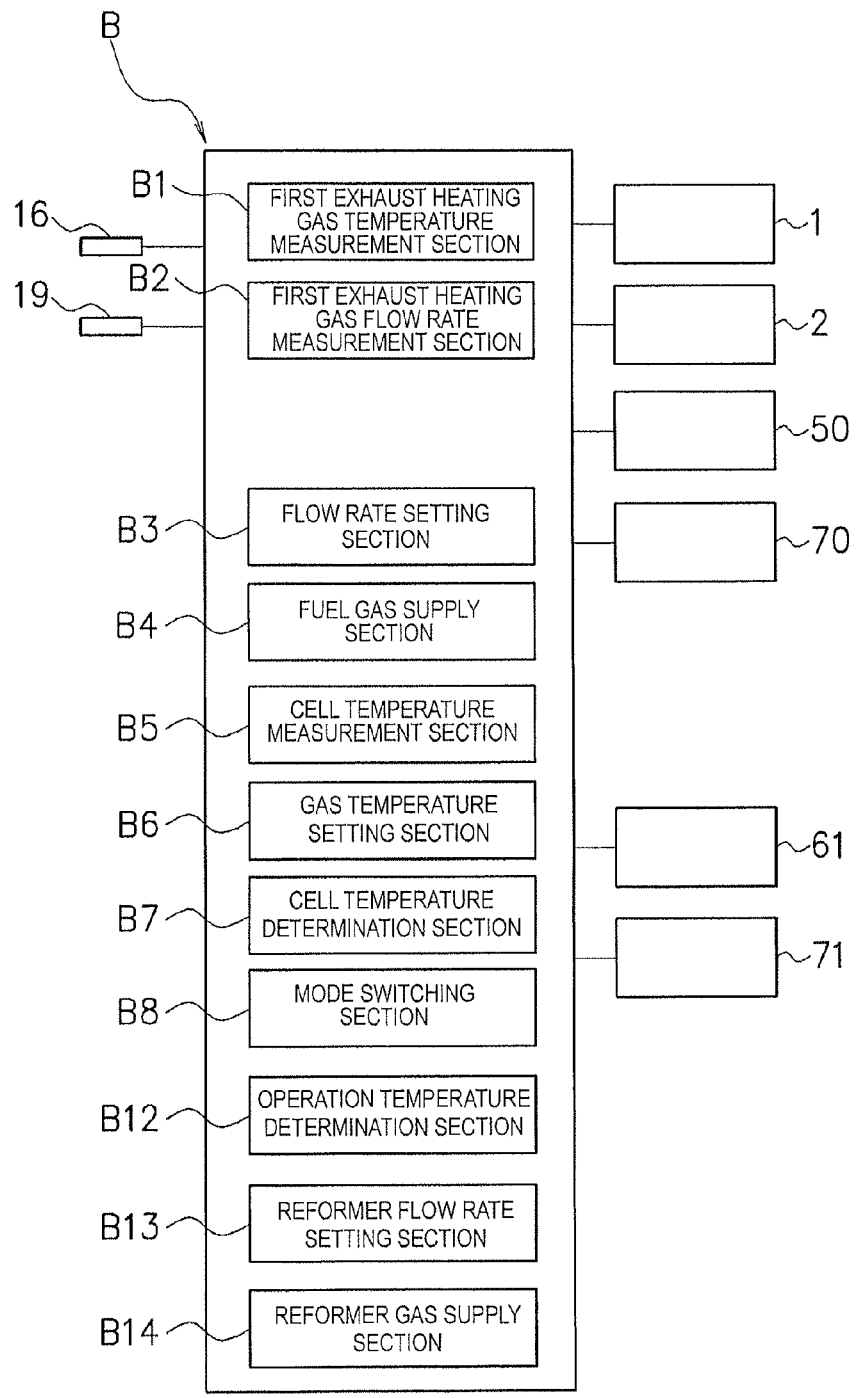
FIG. 8 is a schematic block diagram of a controller of the fuel cell system according to the third embodiment.
Figure 9:
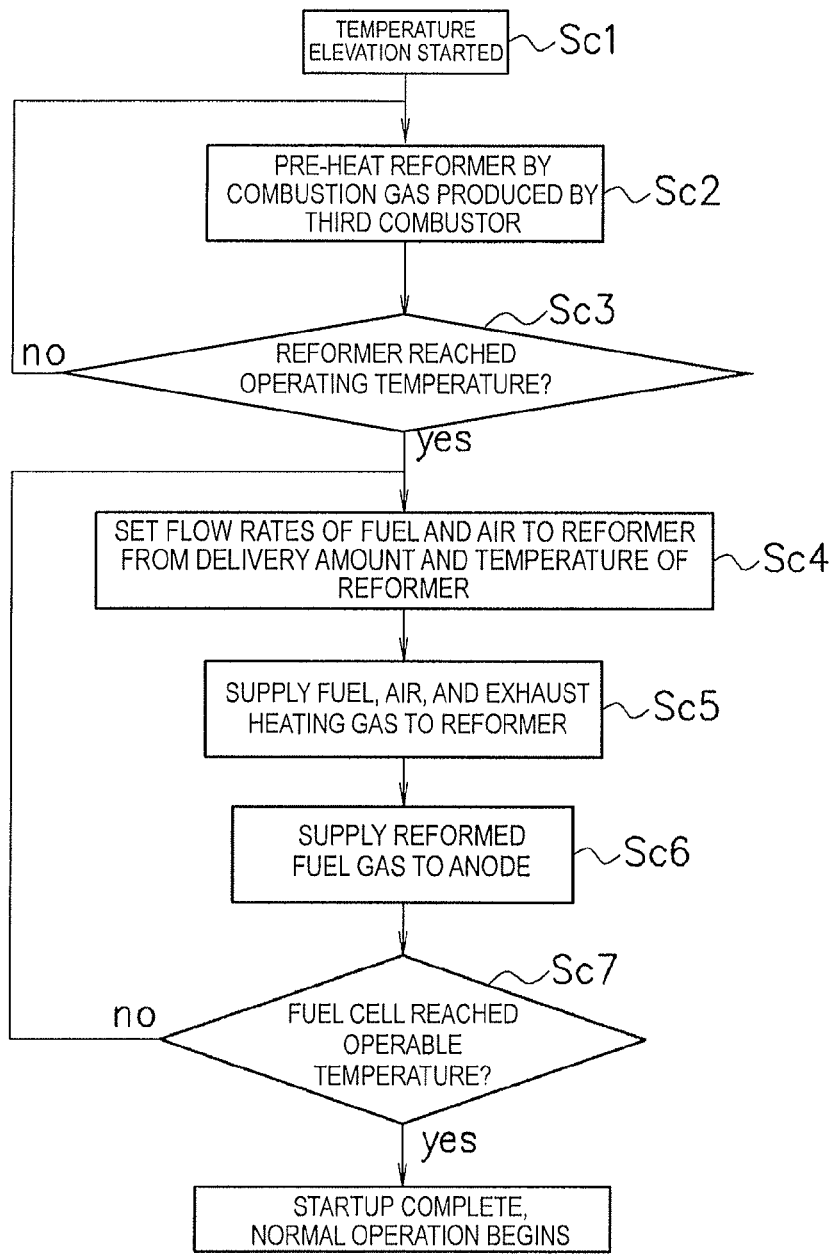
FIG. 9 is a flowchart of a fuel cell temperature-raising method executed by the controller of the fuel cell used in the fuel cell system according to the third embodiment.

Referring now to FIGS. 7 to 9, a fuel cell system A3 in accordance with a third embodiment will now be explained. In view of the similarity between this third embodiment and the prior embodiments, the parts of the fuel cell system A3 of the third embodiment that are identical to the parts of the prior embodiments will be given the same reference symbols as the parts of the prior embodiments. Moreover, the descriptions of the parts of the third embodiment that are identical to the parts of the prior embodiments have been omitted for the sake of brevity. FIG. 7 is a schematic block diagram showing a configuration of the fuel cell system A3 according to the third embodiment. FIG. 8 is a schematic block diagram of the controller B of the fuel cell system A3 according to the third embodiment. FIG. 9 is a flowchart showing a fuel cell temperature-raising method executed by the controller B of the fuel cell 10 that is used in the fuel cell system A3.

In addition to the configuration shown in the fuel cell system A1 according to the first embodiment described above, the fuel cell system A3 according to the third embodiment also has a configuration provided with the flow rate regulation valves 61 of the second embodiment, the temperature sensor 62 of the second embodiment and a flow rate regulation valve 71.

A supply pipe 2b is fluidly connected between the intake side of the reformer 30 and the fuel pump 2. Also a supply pipe 30a is fluidly connected between the discharge side of the reformer 30 and the anode 12. The flow rate regulation valve 61 is disposed between the supply pipe 13a, and the return pipe 61a. The return pipe 61a is fluidly connected between the flow rate regulation valve 61 and the supply pipe 30a. In other words, the return pipe 61a is formed for supplying to the anode 12 at least some of the excess exhaust heating gas discharged from the cathode 13 that is not otherwise circulated back to the cathode 13.

The flow rate regulation valve 71 is provided in the return pipe 61a. The flow rate regulation valve 71 is designed so that a supply pipe 71a is fluidly connected between the valve and the intake side of the reformer 30 and exhaust heating gas can be delivered to the anode 12 and the reformer 30. The supply pipe 71a constitutes a third exhaust heating gas return channel for supplying back to the reformer 30 at least some of the exhaust heating gas discharged from the cathode 13. The flow rate regulation valve 71 is connected to the output side of the controller B so as to be selectively opened and closed by opening and closing drive signals outputted from the controller B.

In this embodiment, the controller B includes one or more programs that are used in operation of the fuel cell system A3. Similar to the first embodiment as discussed above, by executing these programs, the controller B performs the functions of the first exhaust heating gas temperature measurement section B1, the first exhaust heating gas flow rate measurement section B2, the flow rate setting section B3, the fuel gas supply section B4, the cell temperature measurement section B5, the gas temperature setting section B6, the cell temperature determination section B7 and the mode switching section B8. However, in this embodiment, in addition to theses functions, the controller B also performs the following functions: (1) determining whether or not the temperature of the reformer 30 has reached an operating temperature; (2) setting the flow rates of fuel and air to the reformer 30 on the basis of the temperature and the delivery amount of the exhaust heating gas discharged from the cathode 13 that is supplied back to the reformer 30 via the supply pipe 71a when it has been determined that the temperature of the reformer 30 has reached the operating temperature; and (3) supplying exhaust heating gas having this set flow rate to the reformer 30.

The programming and/or hardware of the controller B used to perform the function of determining whether or not the temperature of the reformer 30 has reached an operating temperature is referred to as the "operation temperature determination section B12." The reformer 30 is provided with the temperature sensor 30b for acquiring temperature data of the reformer 30. The programming and/or hardware of the controller B used to perform the function of setting the flow rates of fuel and air to the reformer 30 is referred to as the "reformer flow rate setting section B13." The programming and/or hardware of the controller B used to perform the function of supplying exhaust heating gas with this set flow rate to the reformer 30 is referred to as the "reformer gas supply section B14."

The method of raising the temperature of the fuel cell using the fuel cell system A3 having the above-described configuration is described with reference to FIG. 9. FIG. 9 is a flowchart showing the method of raising the temperature of the fuel cell used in the fuel cell system A3.

In the present embodiment, the increase and decrease of the flow rates of hydrogen-containing gas and air supplied to the first combustor 20 are regulated based on the flow rate and temperature of the exhaust heating gas flowing through the return pipe 17 so that the mixed heating gas supplied to the cathode 13 reaches a predetermined temperature, as with the fuel cell system A1 described above.

In step Sc1, the process of raising the temperature of the fuel cell 10 for a startup operation is started, and the process advances to step Sc2.

In step Sc2, the reformer 30 is pre-heated by the exhaust heating gas produced by the third combustor 70. The exhaust heating gas supplied from the cathode 13 is applied to the reforming reaction in the reformer 30, and carbon deposition in the cathode 13 is prevented by the reformed exhaust heating gas. Temperature-adjusting gas of the reformed heating gas is also delivered upstream of the reformer 30 as well as being used in order to mix with the reformed heating gas downstream of the reformer 30.

In step Sc3, a decision is made as to whether or not the reformer 30 has reached the operating temperature. Once the operable temperature is determined to have been reached, the process advances to step Sc4 if the reformer 30 is determined to have reached the operating temperature. Otherwise, if the operable temperature has not been reached, then the process returns to step Sc2.

In step Sc4, the flow rates of fuel and air to the reformer 30 are set from the delivery amount and the temperature of the reformer 30.

In step Sc5, fuel, air, and exhaust heating gas is supplied to the reformer 30.

First, to bring the reformer 30 to an operable temperature (the operating temperature), fuel, air, and exhaust heating gas are supplied to and mixed in the third combustor 70 to produce heating gas. This heating gas is supplied to a heat exchanger 40 provided in order to pre-heat the reformer 30. Thus, the temperature of the reformer 30 is raised. After the reformer 30 has reached the operating temperature, exhaust heating gas supplied from the cathode 13 and fuel are supplied to the reformer 30. In this way, reformed gas is produced.

Since a minuscule amount of oxygen and a large amount of water vapor are included in the exhaust heating gas supplied from the cathode 13, reformed gas is produced in the reformer 30 by a partial oxidizing reaction and a water vapor reforming reaction. Since the partial oxidizing reaction is exothermic and the water vapor reforming reaction is endothermic, a balance between the rates of the two reactions is kept in order to stably operate the reformer 30, i.e., in order to keep the reformer 30 in a predetermined temperature range. Therefore, air is supplied as necessary to the reformer 30 in order to increase the rate of the partial oxidizing reaction.

After the reformed exhaust heating gas has been supplied to the anode 12, the unburned fuel component included in the discharged reformed gas is burned in the third combustor 70, whereby high-temperature fuel gas can be produced and supplied as temperature-regulating gas of the reformer 30 to the heat exchanger 40.

The reformer 30 can be operated in a stable manner within the predetermined temperature range by achieving a balance between the reaction rate in the reformer 30 and the heat from the exhaust heating gas. The exhaust heating gas supplied from the cathode 13 is divided by the flow rate adjustment valve 71 provided upstream of the reformer 30 into a flow rate supplied to the reformer 30 for the reforming reaction and a flow rate supplied downstream of the reformer 30 in order to regulate the temperature of the reformed gas.

Similar to the fuel cell system A2 described above, the exhaust heating gas after mixing is reducing reformed gas containing water vapor and having no risk of carbon deposition, and delivered amount and the amount of reformed gas produced in the reformer 30, i.e., the amount of fuel supplied to the reformer 30 is regulated so that the predetermined temperature is reached.

In step Sc6, the reformed mixed heating gas is supplied to the anode 12.

In step Sc7, a decision is made as to whether or not the fuel cell 10 has reached the operable temperature. Once the operable temperature is determined to have been reached, the process advances to step Sc8. Otherwise, if the operable temperature has not been reached, then the process returns to step Sc4.

In step Sc8, the heating and temperature-raising operation is ended, and the system transitions to the normal operation mode.

Figure 10:
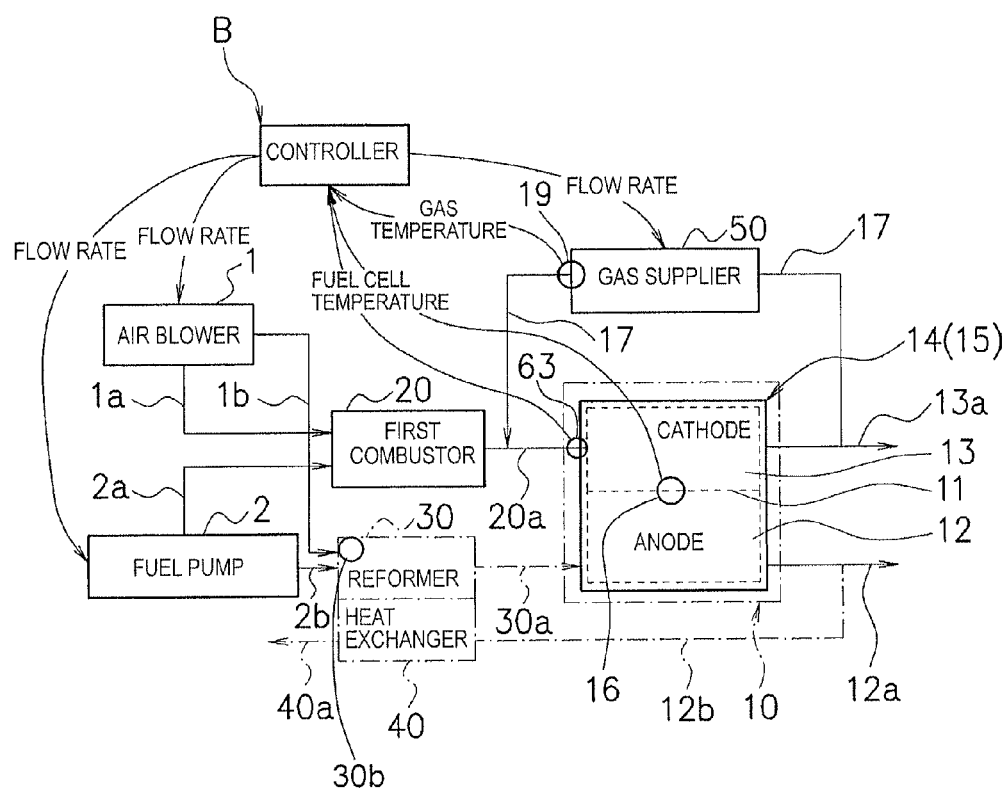
FIG. 10 is a schematic block diagram of a configuration of a fuel cell system according to a fourth embodiment.
Figure 11:
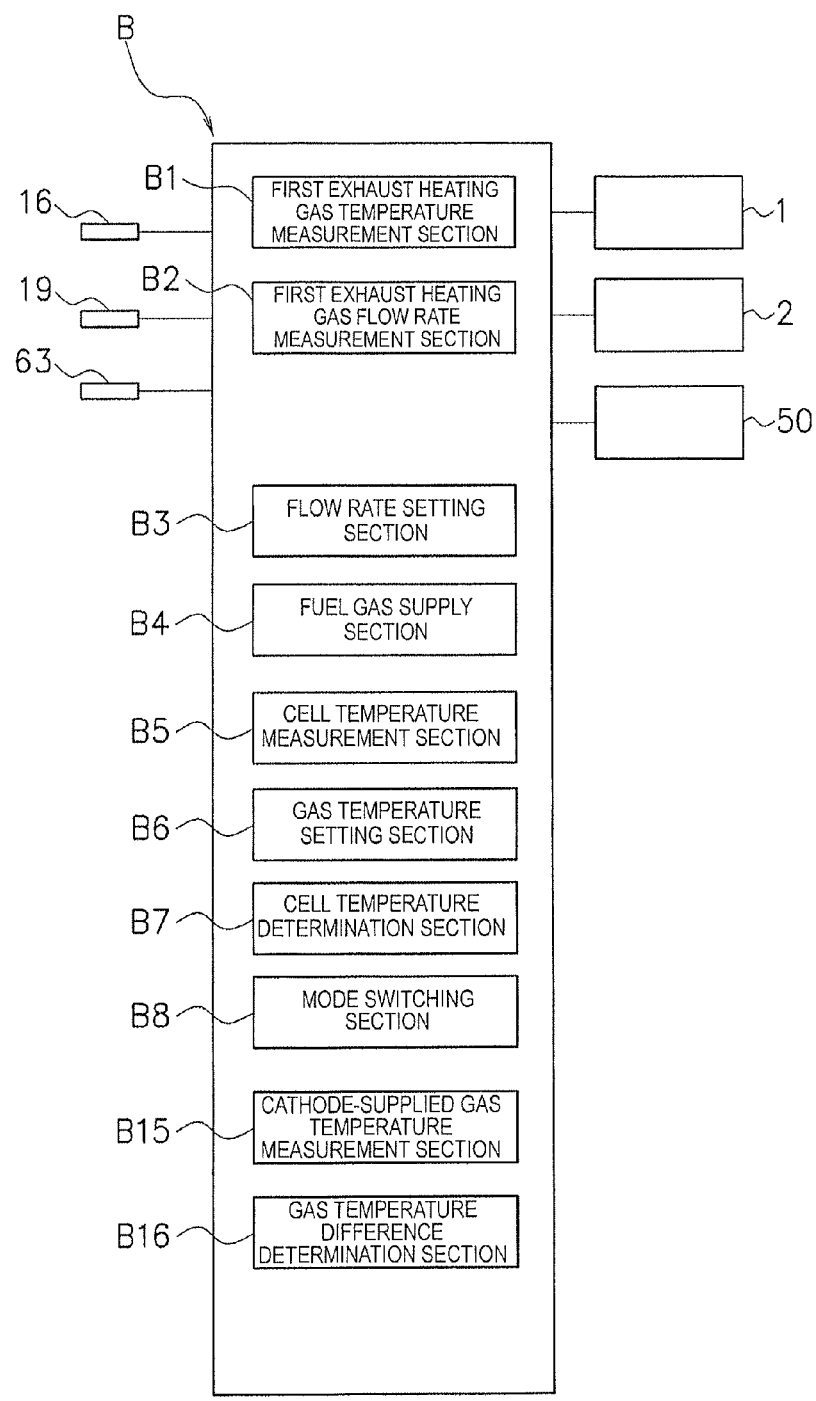
FIG. 11 is a schematic block diagram of a controller of the fuel cell system according to the fourth embodiment.
Figure 12:
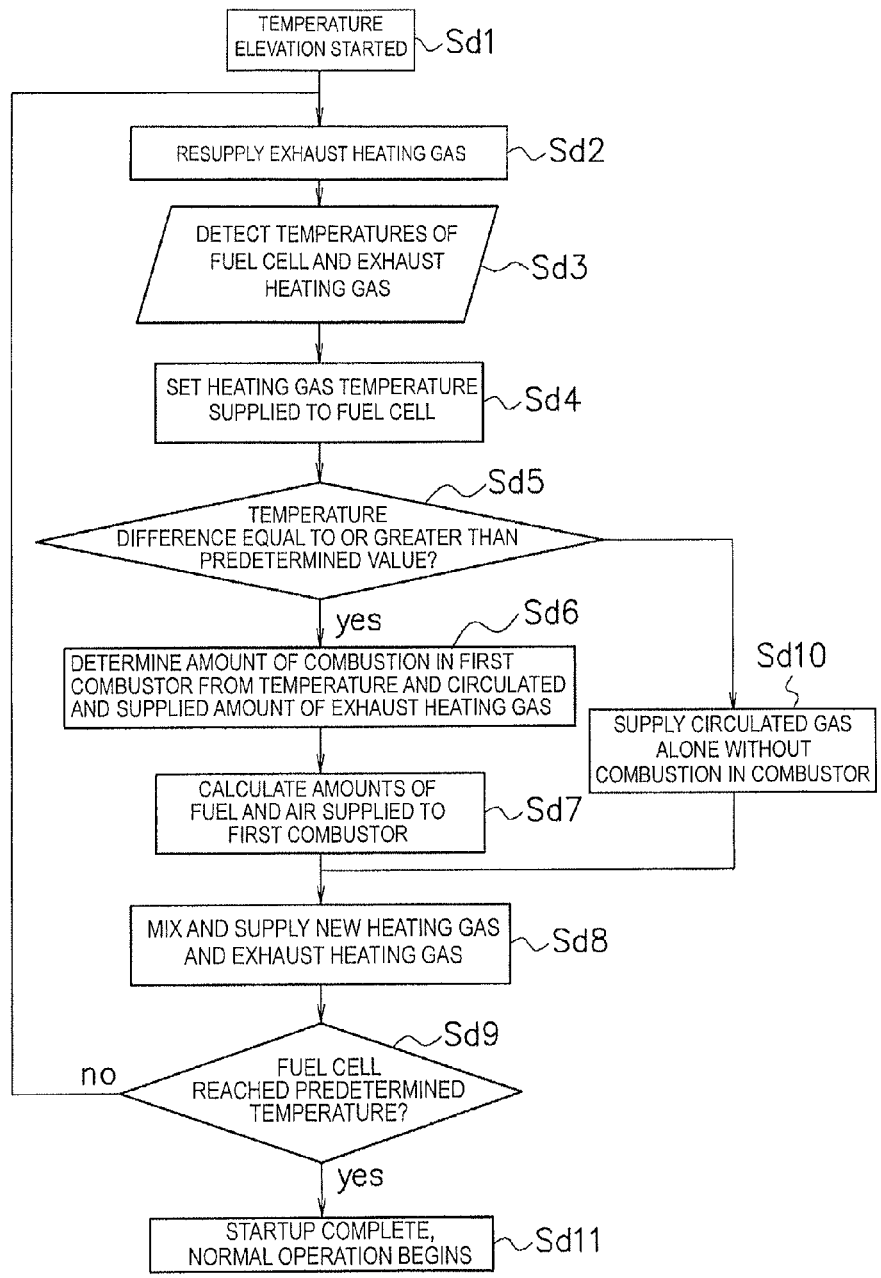
FIG. 12 is a flowchart of a fuel cell temperature-raising method executed by the controller of the fuel cell used in the fuel cell system according to the fourth embodiment.

Referring now to FIGS. 10 to 12, a fuel cell system A4 in accordance with a fourth embodiment will now be explained. In view of the similarity between this fourth embodiment and the prior embodiments, the parts of the fuel cell system A4 of the fourth embodiment that are identical to the parts of the prior embodiments will be given the same reference symbols as the parts of the prior embodiments. Moreover, the descriptions of the parts of the fourth embodiment that are identical to the parts of the prior embodiments have been omitted for the sake of brevity. FIG. 10 is a schematic block diagram showing a configuration of the fuel cell system A4 according to the fourth embodiment. FIG. 11 is a schematic block diagram of the controller B of the fuel cell system A4 according to the fourth embodiment. FIG. 12 is a flowchart showing a fuel cell temperature-raising method executed by the controller B of the fuel cell 10 that is used in the fuel cell system A4.

The fuel cell system A4 according to the fourth embodiment has the configuration shown in the fuel cell system A1 according to the previous first embodiment, to which a temperature sensor 63 is provided. The temperature sensor 63 is arranged for measuring the temperature of the mixed heating gas supplied to the cathode 13 of the fuel cell 10. The temperature sensor 63 is connected to the input side of the controller B. In other words, acquired temperature data of exhaust heating gas is inputted into the controller B.

In this embodiment, the controller B includes one or more programs that are used in operation of the fuel cell system A4. Similar to the first embodiment as discussed above, by executing these programs, the controller B performs the functions of the first exhaust heating gas temperature measurement section B1, the first exhaust heating gas flow rate measurement section B2, the flow rate setting section B3, the fuel gas supply section B4, the cell temperature measurement section B5, the gas temperature setting section B6, the cell temperature determination section B7 and the mode switching section B8. However, in this embodiment, in addition to theses functions, the controller B also performs the following functions: (1) measuring the temperature of the mixed heating gas supplied to the cathode 13; and (2) determining the temperature difference between the mixed heating gas supplied to the cathode 13 and the exhaust heating gas flowing through the return pipe 17.

The programming and/or hardware of the controller B used to perform the function of measuring the temperature of the mixed heating gas supplied to the cathode is referred to as the "cathode-supplied gas temperature measurement section B15." In the present embodiment, the temperature of the mixed heating gas is measured based on temperature data acquired by the temperature sensor 63. The programming and/or hardware of the controller B used to perform the function of determining the temperature difference between the mixed heating gas supplied to the cathode 13 and the exhaust heating gas flowing through the return pipe 17 is referred to as the "gas temperature difference determination section B16." In other words, the gas temperature difference determination section B16 determines whether or not the temperature difference between the mixed heating gas supplied to the cathode 13 and the exhaust heating gas discharged from the cathode 13 exceeds a predetermined value. Upon determining that this temperature difference is outside of a predetermined range, the gas temperature setting section B6 resets the temperature of the heating gas supplied to the cathode 13 so that the temperature difference reverts back into the predetermined range.

The method of raising the temperature of a fuel cell that uses the fuel cell system A4 having the above-described configuration is described with reference to FIG. 12. In the present embodiment, the flow rates of the fuel and the air supplied to the first combustor 20 are regulated based on the flow rate and the temperature of the exhaust heating gas flowing through the return pipe 17 so that the heating gas supplied to the cathode 13 reaches a predetermined temperature, similar to the fuel cell system A1 described above.

In step Sd1, the process of raising the temperature of the fuel cell 10 for a startup operation is started, and the process advances to step Sd2.

In step Sd2, the exhaust heating gas is supplied back through the return pipe 17.

In step Sd3, the temperatures of the fuel cell 10 and the exhaust heating gas are detected, measured and stored.

In step Sd4, the temperature of the heating gas supplied to the fuel cell 10 is set. Specifically, the temperature of the heating gas supplied to the fuel cell 10 is set based on the temperature of the fuel cell 10.

In step Sd5, a decision is made as to whether or not the temperature difference between the fuel cell 10 and the exhaust heating gas is equal to or greater than a predetermined value. Upon determining that this temperature difference is equal to or greater than the predetermined value, the process advances to step Sd6. Otherwise, if this temperature difference is not equal to or greater than the predetermined value, then the process advances to step Sd10. In other words, a decision is made as to whether or not the supplied heating gas temperature minus the temperature of exhaust heating gas circulating through return pipe 17 exceeds the predetermined value.

In step Sd6, the amount of combustion in the first combustor 20 is determined from the temperature and the circulated supplied amount of the exhaust heating gas.

In step Sd7, fuel and air are supplied to the first combustor 20 in amounts determined by calculation.

In step Sd8, new heating gas and exhaust heating gas are mixed and supplied.

In step Sd9, a decision is made as to whether or not the fuel cell 10 has reached a predetermined temperature. When the predetermined temperature is determined to have been reached, the process advances to step Sd11, otherwise the process returns to step Sd2.

In step Sd10, in cases in which the predetermined value is exceeded, combustion is not performed in the first combustor 20, and exhaust heating gas alone is supplied through the return pipe 17 to the fuel cell 10. The upstream side of the fuel cell 10 is thereby cooled while the downstream side is heated, and the temperature can immediately be rectified.

In step Sd11, the heating and temperature-raising operation is ended, and the system transitions to the normal operation mode.

A summary of the fuel cell system A4 according to the present embodiment is as follows. Specifically, when the temperature difference between the upstream and downstream sides of the fuel cell 10 has reached the predetermined value, the heating gas produced in the first combustor 20 is supplied to the fuel cell 10 without combining with the circulating gas. In other words, a system of cooling the combustion gas supplied to the fuel cell 10 is used, whereby the temperature difference between the upstream and downstream sides of the fuel cell 10 can be immediately resolved. The thermal stress created in the fuel cell 10 can be reduced, whereby the reliability of the fuel cell 10 during temperature elevation is improved. Furthermore, when the temperature of the supplied heating gas is lowered in cases of an upstream/downstream temperature difference, the fuel cell 10 is cooled, and heat supplied to the fuel cell 10 is temporarily transferred to the heating gas.

At this time, if the exhaust heating gas is circulated as it is in this system, heat supplied to the fuel cell 10 is circulated back to the fuel cell 10, but in a conventional system which does not circulate exhaust heating gas, heat taken from the fuel cell 10 flows out of the system. Therefore, extra heat must be supplied in order to raise the temperature of the fuel cell 10, which causes fuel consumption to be worse, but there is no such worsening of fuel consumption during temperature elevation in the present system, and upstream/downstream temperature differences can be immediately resolved.

In the present embodiment, in view of improving reliability, a system is used in which the temperature of the heating gas is reduced when an upstream/downstream temperature difference has occurred, but other options include using a system in which the temperature-raising rate is reduced, a system in which heating gas of the same temperature is supplied, or the like. At such a time, an appropriate predetermined value (allowable value) of the upstream/downstream temperature difference is set.

In cases in which the temperature of the fuel gas is reduced, the predetermined value is preferably set to a comparatively high temperature because the temperature difference can be immediately reduced, and in cases in which the temperature-raising rate is reduced, the predetermined value is set to a comparatively low temperature because the temperature difference is resolved at a slow rate. Furthermore, the upstream/downstream temperature difference can also be resolved by combining systems in which the temperature-raising rate is reduced at a first predetermined value, the temperature is maintained at a second predetermined value, the temperature is reduced at a third predetermined value, etc.

While only selected embodiments have been chosen to illustrate the present invention, it will be apparent to those skilled in the art from this disclosure that various changes and modifications can be made herein without departing from the scope of the invention as defined in the appended claims. For example, in the present embodiment described above, an example is described in which an gas supplier 50 is provided to the return pipe 17, but instead of the gas supplier 50 being provided, the flow channel cross section of the discharge pipe 13a and the return pipe 17 can be designed so that the ratio of fuel gas to air in the first combustor 20 falls within the desired range, in view of the quantity of air flowing through the cathode 13 when the cell stack 15 has reached a predetermined temperature.

Also, for example, the flow channel cross sections are not limited to being different from each other; another option is to appropriately set the flow channel lengths of the discharge pipe 13a and the return pipe 17.

In the present embodiment, an example was presented in which the gas supplier was provided to the return pipe, but in another configuration, e.g., the gas supplier is shared with a circulation part of the anode used during the normal operation mode. Specifically, pipes and switching valves can be appropriately connected and used accordingly so as to function as circulation device for the cathode during temperature elevation and for the anode during normal operation.

An air blower was described as an example of a gas supplier, but an ejector or the like can also be suitably used.

Thus, the present invention is not limited to the embodiments described above; modifications such as described hereunder can be made. For example, components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments are provided for illustration only, and not for the purpose of limiting the invention as defined by the appended claims and their equivalents.

What is claimed is:

1. A fuel cell system comprising:
   a fuel cell including a solid electrolyte cell with an anode and a cathode, the fuel cell being configured to generate power by reacting a hydrogen-containing gas and an oxygen-containing gas;
   a first combustor arranged to selectively supply a heating gas to the cathode of the fuel cell;
   a second combustor arranged to selectively supply a heating gas to the anode of the fuel cell;
   a first heating gas return channel arranged to mix at least some exhaust gas discharged from the cathode with the heating gas from the first combustor such that a mixed heating gas of the exhaust gas from the cathode and the heating gas from the first combustor is supplied to the cathode;
   a second heating gas return channel arranged to mix at least some exhaust gas discharged from the cathode with the heating gas from the second combustor such that a mixed heating gas of the exhaust gas from the cathode and the heating gas from the second combustor is supplied to the anode; and
   a gas supplier connected to the first heating gas return channel for supplying the exhaust gas from the cathode to mix with the heating gas from the first combustor.

2. The fuel cell system according to claim 1, wherein the second heating gas return channel is arranged such that the exhaust gas supplied back to the anode is at least some of an excess portion of the exhaust gas discharged from the cathode that is not supplied back to the cathode.

3. The fuel cell system according to claim 1, further comprising
   a first exhaust heating gas temperature measurement section arranged to measure a temperature of the exhaust gas flowing through the first heating gas return channel;
   a first exhaust heating gas flow rate measurement section arranged to measure a flow rate of the exhaust gas flowing through the first heating gas return channel;
   a first flow rate setting section arranged to set flow rates of the hydrogen-containing gas and the oxygen-containing gas supplied to the first combustor such that the mixed heating gas supplied to the cathode reaches a predetermined temperature, the flow rates of the hydrogen-containing gas and the oxygen-containing gas supplied to the first combustor being based on the flow rate measured by the first exhaust heating gas temperature measurement section and the temperature measured by the first exhaust heating gas flow rate measurement section; and
   a fuel gas supply section arranged to supply the hydrogen-containing gas and the oxygen-containing gas to the first combustor at the flow rates set by the flow rate setting section.

4. The fuel cell system according to claim 3, further comprising
   a cell temperature measurement section arranged to measure a temperature of the fuel cell;
   a gas temperature setting section arranged to set a temperature of the heating gas supplied from the first combustor to the cathode based on the temperatures measured by the first exhaust heating gas temperature measurement section and the cell temperature measurement section;
   a cell temperature determination section that determines whether the fuel cell has reached an operation starting temperature; and
   a mode switching section arranged to switch from a temperature-raising mode to a normal operation mode upon determining that the fuel cell has reached the operation starting temperature.

5. The fuel cell system according to claim 4, wherein the gas temperature setting section is arranged to set the temperature of the heating gas supplied from the first combustor to increase over time to a target temperature.

6. The fuel cell system according to claim 1, further comprising
   a second exhaust heating gas flow rate measurement section arranged to measure a flow rate of the exhaust gas supplied to the anode by the second heating gas return channel;
   a second exhaust heating gas temperature measurement section arranged to measure a temperature of the exhaust gas supplied to the anode by the second heating gas return channel; and
   a second flow rate setting section arranged to set flow rates of the hydrogen-containing gas and the oxygen-containing gas supplied to the second combustor such that a steam-to-carbon ratio and a temperature of the exhaust gas supplied to the anode reach predetermined values, the flow rates of the hydrogen-containing gas and the oxygen-containing gas supplied to the second combustor being set based on the flow rate measured by the second exhaust heating gas flow rate measurement section and the temperature measured by the second exhaust heating gas temperature measurement section.

7. The fuel cell system according to claim 3, further comprising
   a second exhaust heating gas flow rate measurement section arranged to measure a flow rate of the exhaust gas supplied to the anode by the second heating gas return channel;

a second exhaust heating gas temperature measurement section arranged to measure a temperature of the exhaust gas supplied to the anode by the second heating gas return channel; and a second flow rate setting section arranged to set flow rates of the hydrogen-containing gas and the oxygen-containing gas supplied to the second combustor such that a steam-to-carbon ratio and a temperature of the exhaust gas supplied to the anode reach predetermined values, the flow rates of the hydrogen-containing gas and the oxygen-containing gas supplied to the second combustor being set based on the flow rate measured by the second exhaust heating gas flow rate measurement section and the temperature measured by the second exhaust heating gas temperature measurement section.

8. The fuel cell system according to claim 4, further comprising
a second exhaust heating gas flow rate measurement section arranged to measure a flow rate of the exhaust gas supplied to the anode by the second heating gas return channel;
a second exhaust heating gas temperature measurement section arranged to measure a temperature of the exhaust gas supplied to the anode by the second heating gas return channel; and
a second flow rate setting section arranged to set flow rates of the hydrogen-containing gas and the oxygen-containing gas supplied to the second combustor such that a steam-to-carbon ratio and a temperature of the exhaust gas supplied to the anode reach predetermined values, the flow rates of the hydrogen-containing gas and the oxygen-containing gas supplied to the second combustor being set based on the flow rate measured by the second exhaust heating gas flow rate measurement section and the temperature measured by the second exhaust heating gas temperature measurement section.

9. The fuel cell system according to claim 1, further comprising
a flow rate regulation valve arranged on the discharge side of the cathode downstream from the first heating gas return channel, the flow rate regulation valve being connected to the second heating gas return channel to control an amount of the exhaust gas discharged from the cathode that is mixed with the heating gas from the second combustor.

10. The fuel cell system according to claim 6, further comprising
a flow rate regulation valve arranged on the discharge side of the cathode downstream from the first heating gas return channel, the flow rate regulation valve being connected to the second heating gas return channel to control an amount of the exhaust gas discharged from the cathode that is mixed with the heating gas from the second combustor,
the second exhaust heating gas temperature measurement section including a temperature sensor disposed on the flow rate regulation valve.

11. A solid oxide fuel cell temperature raising method comprising:
producing a heating gas in a first combustor that receives a hydrogen-containing gas and an oxygen-containing gas;
producing a heating gas in a second combustor that receives a hydrogen-containing gas and an oxygen-containing gas;
recirculating a first portion of exhaust gas discharged from a cathode of a fuel cell back to an intake side the cathode by using a gas supplier that causes the exhaust gas to mix with the heating gas from the first combustor to produce a mixed heating gas that flows through the cathode;
recirculating a second portion of the exhaust gas discharged from the cathode of the fuel cell to an intake side of an anode of the fuel cell such that the exhaust gas mixes with the heating gas of the second combustor to produce a mixed heating gas that flows through the anode, the recirculation of the first and second portions of the exhaust gas discharged from the cathode being executed before fuel cell operation is started such that the fuel cell heats to an operating temperature of the fuel cell;
measuring a temperature of the first portion of the exhaust gas being recirculated from the cathode;
measuring a flow rate of the first portion of the exhaust gas being recirculated from the cathode;
setting flow rates of the hydrogen-containing gas and the oxygen-containing gas supplied to the first combustor such that the mixed heating gas supplied to the cathode reaches a predetermined temperature, the flow rates of the hydrogen-containing gas and the oxygen-containing gas supplied to the first combustor being set based on the measured temperature and the measured flow rate of the first portion of the exhaust gas discharged from the cathode; and
supplying the fuel and the oxygen-containing gas to the first combustor at the set flow rates.

12. The solid oxide fuel cell temperature raising method according to claim 11, further comprising:
measuring a temperature of the second portion of the exhaust gas being recirculated from the cathode;
measuring a flow rate of the second portion of the exhaust gas being recirculated from the cathode;
setting flow rates of the hydrogen-containing gas and the oxygen-containing gas supplied to the second combustor such that a steam-to-carbon ratio and a temperature of the exhaust gas recirculated to the anode reach predetermined values, the flow rates of the hydrogen-containing gas and the oxygen-containing gas supplied to the second combustor being set based on the measured temperature and the measured flow rate of the second portion of the exhaust gas; and
supplying the fuel and the oxygen-containing gas to the second combustor at the set flow rates.

* * * * *